INVENTORS
René Fernand Victor Girard
BY Marie-Claire Girard

ATTORNEY

INVENTORS
René Fernand Victor Girard
Marie-Claire Gidon

PROCESS FOR TREATING SUBSTRATES OF THIN MAGNETIC FILMS

Filed May 20, 1970 4 Sheets-Sheet 3

INVENTORS
René Fernand Victor Girard
Marie-claire Giddon

PROCESS FOR TREATING SUBSTRATES OF THIN MAGNETIC FILMS

Filed May 20, 1970

INVENTORS
René Fernand Victor Girard
Marie-Claire Gidon

United States Patent Office 3,666,641 Patented May 30, 1972

3,666,641

PROCESS FOR TREATING SUBSTRATES OF THIN MAGNETIC FILMS

Rene Fernand Victor Girard and Marie-Claire Gidon, Grenoble, France, assignors to Societe Industrielle Honeywell Bull, Paris, France Filed May 20, 1970, Ser. No. 39,032
Claims priority, application France, May 27, 1969, 6917172
Int. Cl. C23b *1/00*
U.S. Cl. 204—141 12 Claims

ABSTRACT OF THE DISCLOSURE

A process for treating the substrate of a thin magnetic film to obtain a surface state which reduces the sensitivity of the film to stray magnetic fileds and which improves the non-destructive readout properties of the film, wherein, prior to being coated with the magnetic film, the substrate is immersed in an acid electrolytic bath and employed as an electrode in such bath, and wherein the atack on the substrate in the bath is controlled by a current of constant density along the length of the substrate.

BACKGROUND OF THE INVENTION

This invention concerns a process for the treatment of substrates for thin ferromagnetic films, and more particularly to a process for obtaining on the substrate for a thin ferromagnetic film a surface state which improves the non-destructive readout properties of the film, or which provides it with such properties if it does not possess them, and which augments the protection of the film against the action of stray magnetic fields.

The possibility of utilizing thin magnetic films for the realization of fast memories, of large capacity and of reduced size, results from the fact that these films are capable of assuming different stable magnetic states and of transferring, while undergoing a reversal of magnetization, from one state to another in a very short period, of the order of a few nanoseconds. These films are generally obtained by depositing a ferromagnetic material on a substrate, by electrolytic means or by evaporation under vacuum. This deposition is effected in the presence of an orienting magnetic field for providing a uniaxial anisotropy of magnetization; i.e., a direction, termed the easy axis, along which the magnetization of the film is preferably oriented. This direction persists when, at the end of the deposition process, the orienting magnetic field is removed.

There exists, at the present time, various types of thin film magnetic memories. In some of these memories each memory plane is formed of two sets of exciting conductors; i.e., one set of parallel conductors termed "word" conductors, and one set of parallel conductors termed "digit" conductors, orthogonal to the first set. A certain number of flat magnetic film elements are located at the intersections of these conductors these film elements being disposed on a substrate so that their easy axes are oriented parallel to the word conductors.

In another form, each memory plane constitutes a set of word conductors and a set of digit conductors disposed perpendicularly to the word conductors, each digit conductor being in the form of the rod or wire. The digit conductor is covered, at least in the vicinity of its intersections with word conductors, with a thin film of ferromagnetic material. This film has a circumferential anisotropy; i.e., its direction of easy magnetization is circular. This form of memory plane permits the utilization of conductors of very small diameter, and correspondingly, an important reduction in the dimensions of the memory as well as the intensity of the selection currents.

In the instance where each of the digit conductive wires is covered with a continuous magnetic film wherein the easy axis of magnetization is circumferential, a "storage point" is defined by the intersection of such wire with a word conductor. At each storage point, the magnetization vector at rest occupies either one of two stable positions corresponding to the two opposite directions along the easy axis, thereby permitting representation of the binary values "1" and "0."

For changing the direction of magnetization in a storage point; i.e., for modifying the information contained in such point, it is necessary to apply an external magnetic field. This field is the resultant of two fields: a field, termed the "word" field, which is furnished by the word conductor when a current pulse passes therethrough; the word field being perpendicular to the direction of the easy axis of the film; and a field, termed the "digit" field, which is furnished by the digit conductor when a current pulse passes therethrough, the digit field being perpendicular to the word field, therefore oriented along the easy axis. In practice, the word field is applied first and causes a rotation of the magnetization vector to a direction perpendicular to the easy axis, this direction being termed the hard axis of magnetization. Then a current pulse of desired polarity is applied to the digit conductor to cause the magnetization vector to swing away from the hard axis, in order that such vector assume the desired position on the easy axis when the word pulse ceases. Therefore, the polarity of the pulse applied to the digit conductor determines the sense of the magnetic vector along the easy axis; i.e., the binary value of the information which will be placed in memory.

However, it is known that the intensity, the direction, and the duration of the external magnetic field applied determine whether the rotation is reversible or irreversible; i.e., whether the magnetization vector of the storage point returns or not to its initial state after the disappearance of the applied field. There exists a critical value $H_b$, termed the threshold of coherent rotation, such that when the applied magnetic field possesses a component along the easy axis opposite to the magnetization vector and greater in magnitude than this critical value, the rotation is irreversible and is effected according to a phenomenon called coherent rotation. This critical value varies with the direction of the applied magnetic field. In particular, when the field is applied in the direction of the easy axis, this critical value is equal to $H_k$, and is called the anisotropy field. The reversal of the magnetization through coherent rotation is always produced in a very brief time, of the order of nanoseconds.

Independent of the phenomenon of coherent rotation, the magnetization in a storage point can also reverse by a very slow process, termed magnetic domain wall motion.

It is known that in thin magnetic films, the domains, or regions of uniform magnetization, are separated by these walls, or regions of transition of the direction of magnetization, and that these walls can participate in the reversal of the magnetization. If the applied magnetic field possesses a component along the easy axis opposite to the magnetization vector and greater in magnitude than a certain critical value termed the threshold of wall motion, which depends on the direction of the field, the magnetization of the film is reversed completely by the displacement of the walls. The value of this threshold is equivalent to the coersive force $H_c$ and, in films frequently employed, is less than the anisotropy field $H_k$.

In addition, for applied magnetic fields which are utilized in practice, and wherein the component along the hard axis has an amplitude greater than a particular critical value, the threshold of wall motion $H_c$ is greater than the threshold of coherent rotation $H_B$.

Under these conditions, for values of applied magnetic field, which are greater than the threshold of coherent rotation $H_B$, but less than the threshold of wall motion $H_c$, there is obtained again a reversal of magnetization of the film, but this reversal of magnetization is then partial and not complete. In other words, although the majority of the magnetic dipoles of a storage point have sustained a reversal of their sense of orientation, certain dipoles have retained their initial sense of orientation. The magnetization vector of the storage point resulting from the combination of the magnetic actions of all these dipoles is then reversed, although there remain in such storage point, domains in the interior for which the magnetization has not sustained an inversion.

The walls can also be displaced when pulses are applied repetitively a large number of times to the same address of the memory. Thus, under the action of stray fields produced in the hard direction when current pulses are repeatedly applied to the same word conductor, or under the resultant action of these stray fields and a field oriented in an easy direction, the magnetizations of neighboring storage points are progressively perturbed. Similar perturbations occur when the intensity of each of these fields is insufficient to cause a reversal of the magnetization. This produces then a "creeping" of the walls and this phenomenon can continue until the destruction of the information stored in the storage points.

There exists, however, a threshold field $H_{BR}$, less than the threshold of coherent rotation $H_B$, below which this phenomenon does not occur. For reasons indicated below, this threshold $H_{BR}$ is called the threshold of non-destructive readout. For the values of applied magnetic field which are less than this threshold, the magnetization of the film turns in a reversible manner, although the walls undergo no displacement. It is possible under these conditions to effect the reading of the information stored in a storage point, while preventing the total or progressive destruction of the information stored in such storage point and in neighboring storage points. Thus, such reading is called non-destructive.

For effecting such readout it is required that the applied magnetic field have a suitable intensity so that the signals induced by the rotation of the magnetization have a amplitude sufficient to be able to be utilized effectively. It is convenient, therefore, that the threshold $H_{BR}$ below which no wall motion is produced, be sufficiently high that the value of field required for such readout rests below this threshold, and that it be realized as a non-destructive readout not perturbing the information of the neighboring storage points.

For remedying the disadvantages presented by magnetic films which are relatively sensitive to the action of stray leakage fields, there have been proposed in the prior art various technological expedients which permit the realization of memories of thin magnetic films wherein the elements are not unduly sensitive to these perturbations. However, the fabrication of these memories is relatively complex and the equipment necessary for their fabrication is particularly costly. Furthermore, these expedients generally increase the cycle of operation of these memories, thereby partially losing the advantage of the rapid switching of these films.

To avoid resort to such expedients in order to realize a thin magnetic film having a field threshold $H_{BR}$ sufficiently high to present a very low sensitivity to perturbations, there has been proposed a particular fabrication process. This process employs electrolytic means and utilizes an aqueous electrolytic solution which contains, in addition to nickel ions and iron ions, chemical agents capable of forming with the nickel and the iron, a stable compound soluble in water. These chemical agents comprise at least an amine, imine, carboxyl or hydroxyl radical. However, this process, which is capable of yield satisfactory results, is complex and must be carefully applied in order to yield magnetic films in which the magnetic properties are practically identical from one specimen to another.

Therefore, it is the object of the present invention to remedy the disadvantages of the prior art and to provide a process permitting obtaining, on a substrate for a thin magnetic film, a surface state such that the film deposited on such substrate is practically insensitive to perturbations, and in which the field at which wall motion occurs, the coercive field, is increased.

Another object of the invention is to provide, in a process for fabricating a memory element consisting of a copper substrate covered with a thin magnetic film presenting uniaxial anisotropy, a treatment of the substrate prior to its coating with the magnetic film.

SUMMARY OF THE INVENTION

In accordance with the instant invention, the substrate for receiving the magnetic film is immersed in an aqueous solution of hydrochloric acid of between 5% and 45% concentration, at the ambient temperature and for a duration of the order of one minute. In such immersion the substrate is utilized as an electrode, the attack on the substrate in the bath being regulated by a constant current density. The value of the current density is chosen after a determination of curves which represent, for the concentration of hydrochloric acid chosen, the variations of the threshold of non-destructive readout and of the threshold of coherent rotation as a function of the current density. The value of current density selected is that for which the threshold of non-destructive readout is greater than approximately 115 millioersteds and for which the difference between the threshold of coherent rotation and the threshold of non-destructive readout is minimum. The state of the surface of the resulting substrate is such that the thin magnetic film which is subsequently deposited on the substrate is virtually insensitive to the action of stray magnetic fields and presents a high coercive force.

The treatment of this invention provides for obtaining, in a simple and economical manner, thin magnetic films which under normal conditions of employment are virtually insensitive to the action of stray leakage fields. Moreover, this treatment provides for improving further the protection of magnetic materials which have been especially fabricated for presenting a relatively low sensitivity to these perturbations. To this effect, the process employed in the prior art for obtaining a film with very little sensitivity to the action of perturbing fields is found to be greatly improved if it is utilized in combination with the treatment of the instant invention.

BRIEF DESCRIPTION OF THE DRAWING

The invention will be described with reference to the accompanying drawing, wherein.

DESCRIPTION OF THE PREFERRED EMBODIMENT

The fundamental concepts useful for an understanding of the invention, which concerns the switching mechanism of thin magnetic films, will now be presented. The reversing of a memory element composed of a thin magnetic film may be understood by reference to FIG. 1, which represents schematically the different zones of intensity of the field. $H_x$ and $H_y$ are the respective components of a control field in the directions of the axis of easy magnetization FA and of the axis of hard magnetization DA. It will be assumed, for greater clarity that when, in the absence of a control field, the magnetization vector of the film is oriented in the negative direction along easy axis FA it represents the storage of the binary value "0," and when oriented in the positive direction along the easy axis it represents the storage of a binary "1."

When a very weak magnetic control field is applied, the magnetization of the film turns from one of its two stable positions; i.e., from a positive direction along easy axis FA or from a negative direction along the easy axis, to align itself in the direction of the control field. After the removal of the control field, the magnetization of the film returns to its original position. The rotation of the magnetization of the film under these conditions is reversible. The rotation of the magnetization is always reversible when the end of the vector representing the control field lies in the zone which, in FIG. 1, is shown by the symbol I.

When the vector value of the magnetic control field crosses any critical value represented by the curve SC, which delimits zone I, the magnetization of the film may be reversed entirely, or only partially, by the motions of the walls of the magnetic domains. Thus, the magnetization of the film will be partially or totally reversed where the component $H_x$ of a control field is oriented in a direction opposite to that of the magnetization of the film along the easy axis, if the end of the vector representing the control field lies outside zone I. In the instance where a critical value represented by curve SC is only exceeded by a relatively small amount; i.e., if the end of the vector representing the control field lies in the zone denoted by the symbol II in FIG. 1, a creeping of the domain walls is produced, which leads to the progressive destruction of the information. If a magnetic field in zone II is applied and removed a substantial number of times, movement of the walls is observed, this movement being due to the fact that in the interior of a memory point domains of magnetization which are saturated in a direction opposite to that of the information increase under the repeated action of the control magnetic field. This increase progresses generally from the domains existing at the periphery of the memory point. This phenomena leads in the limit, to the destruction of the information contained in a memory point.

Figure 1:
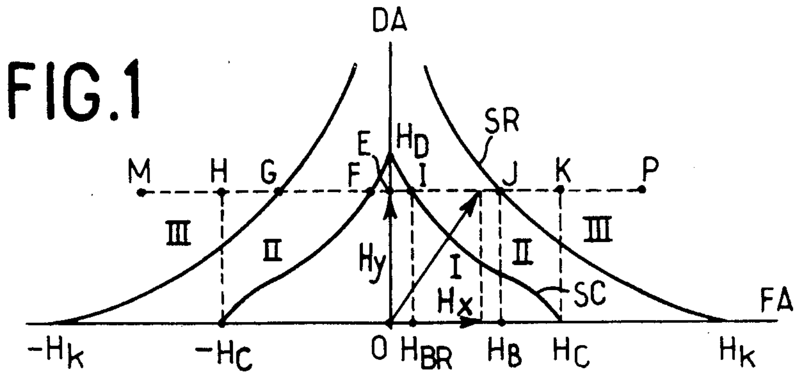
FIG. 1 is a series of curves illustrating the threshold of coherent rotation at different points and the critical threshold of destruction of information in a thin magnetic film sensitive to perturbations.

If now, where the component $H_x$ of a control field is again oriented in a direction opposite to that of the magnetization of the film along the easy axis, the end of the vector representing this control field lies in the zone which, in FIG. 1, is denoted by the symbol III, the magnetization of the film turns, at the time of the application of the control field, from its position along the easy axis to align itself in the direction of the applied control field. However, in this instance the rotation is irreversible, so that the magnetization of the film is found to be reversed when the control field is removed; i.e., the magnetization becomes oriented along the easy axis in a direction opposite that which it had before the application of the control field.

Zone III constitutes the zone of coherent rotation. It is separated from zone II by a curve SR, which represents the threshold of coherent rotation; i.e., the lower limit of the amplitude of the control field for coherent rotation of the magnetization of the film. In the instance of an ordeal film, i.e., with uniform magnetization, curve SR is a hypocycloid with four cusps refined by the equation:

$$H_x^{2/3}+H_y^{2/3}=H_k^{2/3}$$

where $H_k$ designates the anisotropy field.

The readout of the information stored in a memory point is realized by turning the magnetization of the film toward the direction of the hard axis and by observing the voltage induced by such rotation in the digit conductor, or in a sensing conductor disposed parallel to the hard axis. For effecting this reading, an interrogating magnetic field oriented along the hard axis applied to the film by passing a current pulse through the corresponding word conductor. The polarity of the induced voltage depends on the sense of rotation of the magnetic vector of the film, which permits determining whether a binary "1" or "0" is stored in the memory point. However, in order that the signals induced by the rotation of the magnetic vector can be utilized effectively, it is necessary that they have sufficient amplitude. To provide this it is necessary to transmit pulses of appropriate intensity in the word conductor. If the end of the vector representing the control field created by such a pulse lies in zone I, the magnetization of the film is not reversed after the removal of the control field, but if this vector end lies in zone II, the magnetization is split into opposed magnetic domains after removal of the control field. In the first case, the readout is termed non-destructive readout or NDRO. In the second case, the readout is termed destructive, or DRO. It is, therefore, desirable that zone I, which is also sometimes termed the NDRO zone, be sufficiently large to accommodate the employment for readout of relatively large amplitude pulses while realizing a non-destructive readout. This condition has heretofore been seldom satisfied in practice, because the read pulses which must normally be used for obtaining induced signals of appropriate amplitude create magnetic fields of which the intensity generally exceeds a limit value $H_D$ along the hard axis above which the readout is destructive. For realizing this condition of non-destructive readout, it is therefore necessary, as can be determined by comparing FIGS. 1 and 2, that curve SC, which constitutes the boundary between zones I and II and represents the upper limit of the vector value of the field for non-destructive readout, approach curve SR, as closely as possible, curve SR representing the lower limit for coherent rotation of the magnetization. Under these conditions the limit value $H_D$, above which the readout is destructive, is considerably increased. Moreover, zone II, in which the "creeping" of the walls occurs, is found to be substantially reduced, whereby the resistance of the film to the action of stray leakage fields is greatly reinforced. Additionally, as a result of the displacement of curve SC toward curve SR, the coercive force $H_c$ is increased, which denotes an improvement in the remnant properties of the film.

Therefore, the end object is to improve the properties of non-destructive readout of thin magnetic films, or to provide them with these properties if they do not possess them, to reduce the sensitivity of these films to the action of stray leakage fields, and to increase the coercive field of wall motion.

This object is attained, in the instant invention by subjecting the copper substrate to a chemical treatment, before covering it with a thin film of magnetic material. In the example described, this substrate consists of a cylindrical wire of small diameter. However, the chemical treatment which will now be described is equally applicable to substrates having a different form, such as for example a plane support.

The wire conductor, which in the example described serves as the substrate for the thin magnetic film, is constituted, preferentially, of a cylindrical beryllium-copper wire of 130 microns diameter, coated with a layer of copper of some thousands of angstroms thickness. This wire passes through an electrolysis tank containing an aqueous chemical solution which will be defined later herein, and is subjected in the coarse of its passage through the tank to a treatment of its surface, such that the magnetic alloy which will be ultimately deposited on the wire presents the required properties. The wire is driven through the tank at a constant velocity, which, in the example described, is of the order of ten meters per hour. Preferentially, this driving is provided by a driving mechanism which permits pulling the wire through the tank under a very low mechanical tension. For realizing this preferred mode of driving the wire, there can be employed, for example, the driving mechanism described and shown in the French pat. application PV N. 6,910,210, filed Apr. 3, 1969, and in the corresponding U.S. pat. application Ser. No. 24,635, filed Apr. 1, 1970, by R. F. V. Girard and J. LeGuillerm, for Process and Apparatus for Obtaining Wires for Magnetic Memories, such application being assigned to the assignee of the instant application. In the course of its passage through the tank, the wire is completely immersed in the chemical solution therein. In the example described, the length of the wire which is immersed is about 15 centimeters, which based on the specified velocity of the wire, provides for treating the surface of the wire during a period of about one minute. However, if the wire is driven at a different velocity, the time of treatment can be maintained at a value substantially equal to that specified by modifying the dimensions of the tank to increase or reduce the immersed length of the wire.

The solution utilized for treating the wire is an aqueous solution of hydrochloric acid having a concentration equal to a predetermined value between 5% and 45%. This treatment is effected at the ambient temperature, the attack on the wire in the bath being regulated by a constant density current having a value determined by a method which will be indicated hereinafter. In order to provide for the passage of current, an electrode is submerged in the bath, this electrode having a form and disposition established to assure a current density practically constant all along the immersed wire. In the case where it is described to expedite the attack on the wire, this electrode is utilized as the anode, the copper wire serving then as the cathode, whereby the current which is so established is a current of "anodic dissolution." Conversely, however, it is possible to partially inhibit the attack on the wire by utilizing the above-mentioned electrode as the cathode, the wire serving then as the anode, whereby there is maintained in the neighborhood of the wire, a superconcentration of copper ions which reduces the equilibrium of dissolution. In particular, this second mode of operation must be employed when a solution is employed in which the concentration of hydrochloric acid is relatively high; i.e., of the order of 40%, in order to restrain an attack which, in the absence of the control current, would be too strong and no longer permit the film, deposited later on the wire, to present the desired magnetic properties. However, those properties can no longer be obtained, as by restraining the attack with the aid of a control current, if there is utilized a solution in which the concentration of hydrochloric acid exceeds 50%. However, although operating with a constant current density, the degree of attack on the surface of the wire usually is not constant with the passage of time, because of variations of ionic concentrations in the bath and of modifications of the conditions of attack initiated in particular, by the passage of copper to the state of copper ions in solution. In order to provide for a more constant action of the bath on the wire, copper ions are added to the bath at the start, this addition being realized by adding a salt of copper soluble in the solution.

The copper ions are added in sufficient quantity so that the initial concentration of copper ions is high relative to that which will be reached at the end of a certain time by the passing into solution, to the ionic state, of attacked copper. It has been found that it is sufficient to obtain this result, to add a quantity of soluble copper salts such that the consequent concentration of copper ions exceeds 60 milligrams per liter of solution. The addition of the copper ions to the bath assists further, at the beginning, the attack on the wire, which is particularly significant in the case where a solution is used in which the concentration of hydrochloric acid is relatively weak. However, the quantity of the copper salt added to the bath must not be too high, so as not to risk the release of too strong an attack, which would produce a surface state on the wire such that the magnetic film ultimately deposited would no longer present the requisite magnetic properties. Experience has shown that the quantity of copper salt added to the bath must be such that the consequent concentration of copper ions is less than 1.3 grams per liter of solution. It is suitable, consequently, that this quantity is such that the concentration of copper ions which results from this addition comprises between 60 milligrams and 1.3 grams per liter of solution. In the example described, the copper ions are added to the solution in the form of cuprous chloride, but this addition may also be realized by incorporating in the bath any other soluble copper salt. In order to obtain a suitable concentration of copper ions, the quantity of cuprous chloride to add to the bath must comprise between 100 milligrams and 2 grams per liter of solution.

By way of example, a solution suitable for treating the surface of the wire has been realized by utilizing an aqueous solution of 10% hydrochloric acid, which contains further cuprous chloride at a concentration of the order of 1 gram per liter. The required properties have been obtained by subjecting the surface of the wire to the action of such solution, operating at the ambient temperature, for a time of about one minute, the attack being controlled with the aid of a light current of dissolution, of the order of 1.3 milliamperes per square centimeter.

After having undergone this treatment, the wire which emerges from the tank is subjected to a rinsing and then traverses another electrolysis tank containing a bath adapted for depositing on the wire a thin film of magnetic material. This latter bath is composed, for example, of an aqueous solution of salts of iron and nickel, providing for depositing on the wire an alloy of iron and nickel comprising about 18% of iron. However, the surface treatment of the wire is not limited to a particular composition of magnetic material utilized for coating afterward, and there can be deposited on the treated surface of the wire all other magnetic alloys suitable to the fabrication of thin magnetic films. In order to induce a direction of easy magnetization, the deposition of the magnetic material is made in the presence of a magnetic field, this field being oriented so that the direction of easy magnetization presented by the magnetic layer deposited on the wire is circular and coaxial to the axis of the wire.

It is not possible to characterize in a simple fashion the state of surface which is obtained on the wire, prior to the deposit of the magnetic layer, by the treatment described above. However, the measure of the magnetic properties of the magnetic layer which is later deposited on such wire permits the optimization of the topology of the wire, which is not really necessary to characterize directly. The properties of the magnetic layer can be measured by means of an arrangement which will now be described with reference to FIG. 3.

Figure 3:
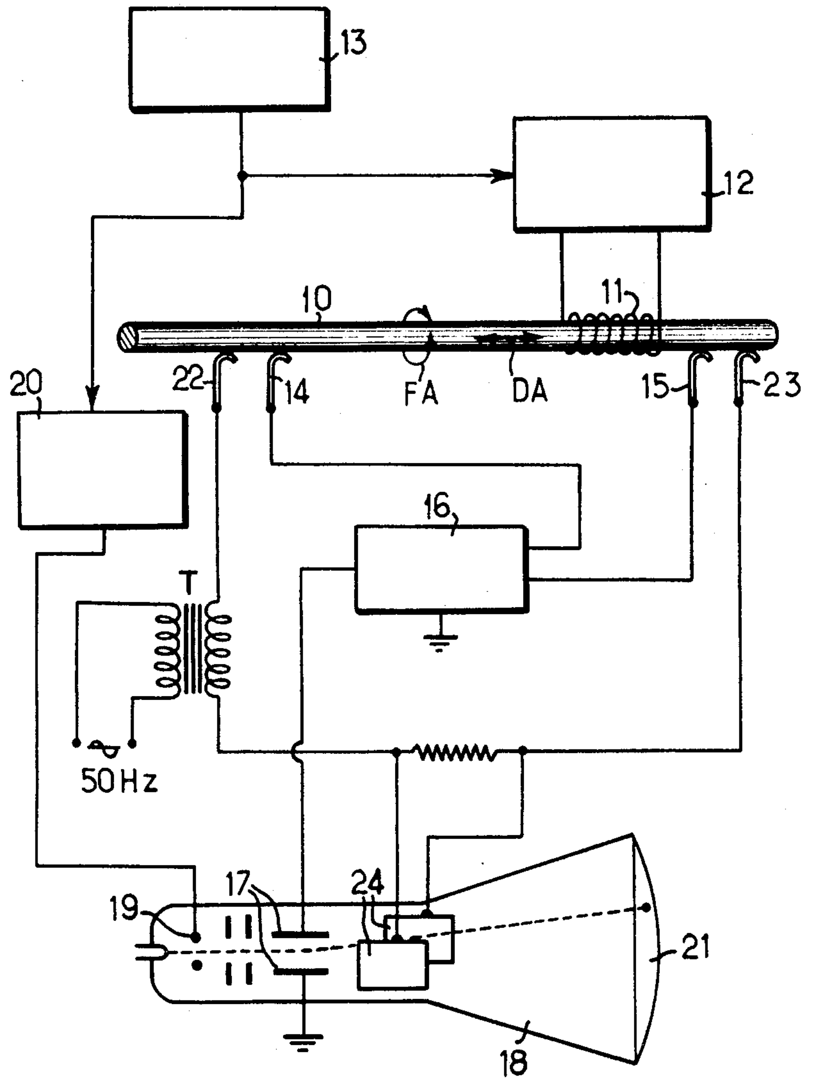
FIG. 3 illustrates an experimental arrangement for studying the magnetic properties of a thin magnetic film deposited on a cylindrical wire substrate.

In FIG. 3, which is a schematic diagram illustrating the principle of the arrangement utilized, there is shown a wide portion 10 assumed to be covered with a thin magnetic film in which the axis of easy magnetization is indicated by the circular direction of the two arrows FA and the hard axis is indicated by the direction of the two arrows DA. In the course of its movement, driven by a device not shown, the wire passes through a winding 11 which is energized by pulses of current supplied by a generator 12. When energized, winding 11 creates a magnetic field parallel to the axis of wire 10, which tends to orient the magnetization of the magnetic film along the hard axis DA. Therefore, winding 11 plays a role analogous to that of a word conductor.

Figure 4:
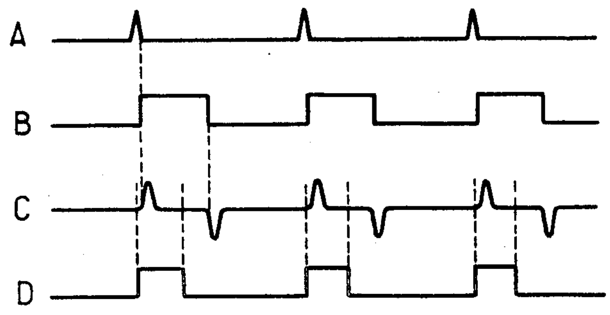
FIG. 4 is a timing diagram of signals which occur in the operation of the arrangement of FIG. 3.

Generator 12 produces square waves, provided for supplying to winding 11 rectangular pulses having the form shown in waveform B in FIG. 4. Generator 12 is controlled by a high frequency pulse generator 13, which generates, at a frequency of 500 kilocycles per second, pulses having the form shown in waveform A in FIG. 4. The pulses produced by generator 13 are supplied to square-wave generator 12, the latter being responsive to these pulses to supply a rectangular pulse to winding 11 each time that it receives a pulse provided by generator 13. The amplitude of these rectangular pulses is such that the intensity of the magnetic field which they create in winding 11 is substantially equal to that of the "word" fields provided during normal operation of a memory which employs memory elements identical to those of which the properties are analyzed by the arrangement of FIG. 3. Each time that winding 11 is energized, the magnetization of the magnetic film rotates away from easy axis FA to become oriented along hard axis DA. This rotation, which can generate an induced voltage in a sensing conductor disposed parallel to the hard axis, generates, similarly, an induced voltage in copper wire 10 which supports the magnetic film. Similarly, each time that winding 11 ceases to be energized, the magnetization of the film returns its alignment along easy axis FA, and such return rotation induces a voltage, of opposite polarity, in copper wire 10. The form of the signal induced in wire 10 is illustrated by wave form C of FIG. 4.

FIG. 3 illustrates two contact members 14 and 15, which are disposed along wire 10 and positioned at two different points on the wire for collecting signals induced by the rotation of the magnetization. Because the magnetic film deposited on the wire is very thin, the electric resistance presented by the film to the flow of radial currents is negligible and has practically no effect on the amplitude of the induced signals. Nevertheless, these signals are suitably amplified by an amplifier 16, before being applied to the vertical deflection plates 17 of a cathode ray oscilloscope 18. Oscilloscope 18 comprises, in addition to the normal focusing electrodes, an electrode 19 which controls the intensity of the beam. The control voltage which is applied to electrode 19 for controlling the intensity of the beam is furnished by a control device 20, which is also connected to pulse generator 13 for receiving the pulses supplied by the latter. Control device 20 is of known structure, and is realized in such a manner that each time it receives a pulse provided by generator 13, it changes the value of the control voltage which it applies to electrode 19, the variations of this control voltage being represented by waveform D of FIG. 4.

The control voltage is adjusted, as is known, in sense and in amplitude so that the electron beam is only transmitted during a brief moment immediately after the generation of a pulse by generator 13, and is suppressed during the remainder of the time. In reference to waveforms C and D of FIG. 4, the intervals during which the beam is established corresponds substantially to the intervals in which the signals induced by the rotation of the magnetization away from the easy axis are applied to vertical deflection plates 17. This manner of operation provides for only demonstrating by the vertical deflection of the beam the action produced by the signals induced when the magnetization of the film turns from easy axis FA toward its orientation along the hard axis DA, and eliminates the action produced by the signals induced when the magnetization returns to its alignment along the easy axis.

Since the frequency of suppression and reestablishment of the beam is high, equal to the pulse frequency of generator 13, 500 kc., the variation of luminous intensity of the figure traced on screen 21 of the oscilloscope is not perceptible to the eye. Thus, this figure appears fixed because of the persistance of the luminous impressions on the retina.

As has been indicated above, the magnetic field which is produced by winding 11, when it is energized, turns the magnetization of the film in the direction of hard axis DA. This field may be represented in FIG. 1 by a vector $H_y$ oriented along the DA axis. It has been shown above that if the end of this vector lies in zone I the rotation of the magnetization is reversible, whereas if it lies in zone II, the rotation provokes, when repeated, a progressive destruction of the magnetization of the magnetic film. In order to be able to analyze the variations of magnetization of the film, it is necessary to apply a control field variable in direction and such that the end of the vector representing the field can enter into any one of zones I, II, and III. Such a control field can be obtained by superposing on the field oriented along the DA axis and represented by the vector $H_y$, a field termed the sweep field, which is oriented along the FA axis and is represented by the vector $H_x$. This sweep field is able to vary in magnitude and in direction between two values determined so that the end of the vector representing the control field can explore each of zones I, II, and III. The end of the sweep field vector moves along a line MP parallel to the FA axis.

The sweep field which is represented by vector $H_x$ and is oriented along easy axis FA is produced, in the arrangement of FIG. 3, by the passage of current through wire 10. This currrent is applied to the wire by means of two contact members 22 and 23 connected respectively to two output terminals of a transformer T. The primary winding of transformer T is energized by an alternating current of 50 cycles per second. In reality, contact members 14 and 22 are combined into a single contact member, as are contact members 15 and 23, but for clarity in the schematic diagram and the explanations these contact members have been represented separately in FIG. 3 for better differentiation of the circuits.

The state of magnetization of the film may be characterized by the magnitude and sense of the signals induced by the rotation of the magnetization of the film, these signals being, as has been seen, applied to vertical deflection plates 17. In order to portray this state of magnetization on screen 21 of the oscilloscope as a function of the direction and amplitude of the control field; i.e., as a function of the direction and magnitude of vector $H_x$ which represents the components along this field, the easy axis there is applied to horizontal deflection plates 24 of the oscilloscope a voltage sample of the circuit provided for producing, by means of wire 10, the sweep field that is parallel to the easy axis. This sample voltage is, from all evidence, proportional to the sweep field. The voltage which is supplied to horizontal deflection plates 24 and the amplitude of the sweep field produced by the passage of current in wire 10 vary in the same manner as the voltage which is applied to the primary winding of transformer T; i.e., according to a sinusoidal function of time, the frequency of these variations being 50 cycles per second.

Figure 5:
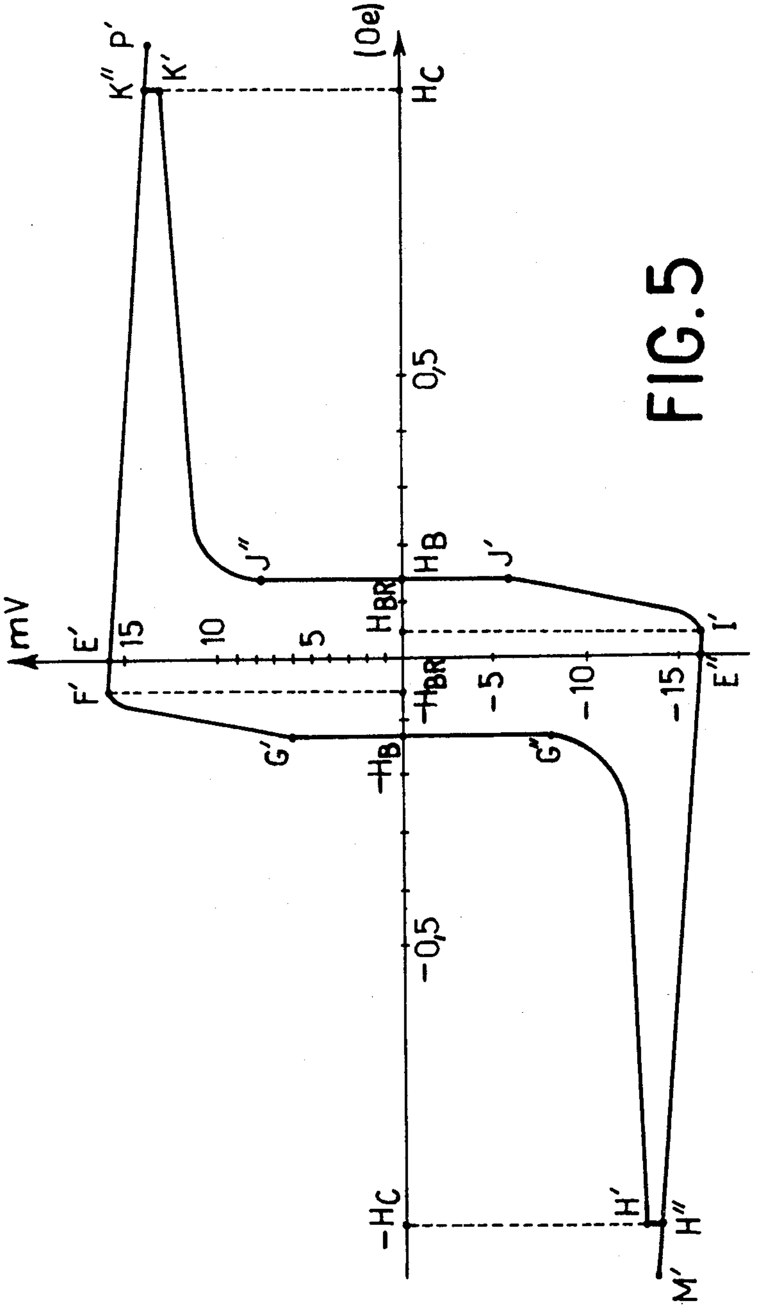
FIG. 5 illustrates a cycle obtained by utilizing the arrangement of FIG. 3, showing the magnetic behavior of the film when it is subjected to an exploring magnetic field.

The curve which is displayed on screen 21 as a result of this sweeping presents the appearance shown in FIG. 5. Inasmuch as the induced signals are applied to vertical deflection plates 17 at a frequency substantially greater than the frequency of the sweep field, this curve, which represents the variations in the maximum amplitude of the induced signals as a function of a voltage proportional to the sweep field, appears continuous on the oscilloscope screen.

In order to conveniently study the variations of the magnetization of the film in the course of the variation of the sweep field, it is necessary that the frequency of application of the pulses supplied to winding 11 be at least equal to $10^4$ times the frequency of the sweep field. This condition is realized, in the example described, by utilizing a pulse generator 13 which generates pulses at the frequency of 500 kc.; i.e., at the minimum requisite frequency. However, it is evident that generator 13 can be replaced by another generator furnishing pulses at a higher frequency.

The curve of FIG. 5, obtained by utilizing the arrangement of FIG. 3, is termed a Belson cycle. The sweep field varies, as indicated above, as a sinusoidal function of time. First, to be considered will be the instant when the sweep field is maximum, which is represented in FIG. 1 by the vector $H_x$ which results from the projection of point P on the FA axis. This field at this instant is oriented in the positive direction of easy axis FA, this positive direction corresponding to the direction of orientation for which the magnetization of the film is assumed to represent the storage of the binary value "1." The resultant control field provided at this instant by the vector combination of the sweep field and the field created by the application of a square pulse to winding 11 is represented in FIG. 1 by a vector OP (not shown so as not to overburden the figure). Urged by the control field, the magnetization of the film rotates and induces in wire 10 a signal having an amplitude represented in FIG. 5 by the ordinate of point P′. When winding 11 ceases to be energized, the magnetization of the film returns to its initial position and induces a signal whose effects are suppressed by the arrangement of FIG. 3, as has been explained above. Accordingly, under these conditions, each time that a rectangular pulse is applied to winding 11 the magnetization of the film is rotated and restored, which generates two induced signals, only the first being utilized in the generation of the cycle of FIG. 5.

From the maximum value represented by the projection of point P on the FA axis, FIG. 1, as the amplitude of the sweep field decreases to zero, the end of the vector representative of the control field moves from point P to point E. Since the sweep field continues to be oriented in the direction of the positive FA axis, during this excursion the magnetization of the film is not reversed by the repetitive fields produced by winding 11 as it is energized by the rectangular pulses. Consequently, the signals induced by the reversible rotation of the magnetization substantially maintain a constant amplitude, whereby, for the variation of the sweep field heretofore specified, the beam spot moves from P′ to E′ and generates a straight segment, theoretically parallel to the easy axis. Actually, however, during the variation of the sweep corresponding to the movement from P′ to E′ of the vector representative of the control field, the angle through which the magnetization of the film turns is not constant, but increases progressively from the direction OP to the direction of the hard axis DA. Accordingly, for this variation of the sweep field, the amplitude of the induced signals increases progressively and gradually as the amplitude of the sweep field diminishes, which is demonstrated in the curve of FIG. 5 by a slight inclination of the segment P′E′ relative to the easy axis. Hence, the ordinate of point P′ is less than that of point E′.

If now, the sweep field is reversed and increased in amplitude, being oriented in the negative direction of the FA axis, the magnetization of the film is varied in a reversible manner or is reversed partially or completely. As long as the end of the vector representative of the control field remains in zone I, FIG. 1; i.e., between points E and F, the signals induced by the rotation of the magnetization maintain substantially constant amplitude, which is demonstrated in FIG. 5 by the movement of the beam spot from point E′ to F′, parallel to the easy axis. After the end of the control field vector passes point F, FIG. 1, and enters zone II, moving from point F toward point G, the magnetization of the film is progressively destroyed by virtue of the phenomenon of "creeping" whereby the amplitude of the signals induced by the rotation of the magnetization diminishes little-by-little under the repeated action of the control field, as shown by the segment F′G′ of the cycle of FIG. 5.

When the end of the vector representative of the control field passes point G and enters zone III, FIG. 1, the magnetization of the film abruptly reverses, although, because a part of the magnetization continues to vary in a reversible manner, this reversal is not total. On the cycle of FIG. 5, this transition corresponds to the segment between point G′ and G″. When, now, the end of the vector representative of the control field continues its movement toward point M, the magnetization domains of the film which during the intervals of time when winding 11 is not energized are oriented along the negative direction of the easy axis increase progressively in number, and this increase is demonstrated by an increase in the amplitude of the induced signals, as shown by the segment G″H′ of the cycle of FIG. 5.

When the end of the vector representative of the control field reaches point H, wherein the projection on the easy axis corresponds to the coercive field of wall motion, $-Hc$, the few remaining magnetization domains which have continued to vary in reversible manner switch definitely to the negative direction along the easy axis, this reversal being demonstrated by the abrupt jump from point H′ to H″ in the cycle of FIG. 5. Following this moment, the signals induced by the rotation of the magnetization maintain a substantially constant amplitude, as shown by the segment H″M′ of the cycle of FIG. 5, this segment corresponding to the movement from H to M of the end of the vector representative of the control field, FIG. 1. When the end of the control field vector reaches point M, the sweep field, oriented in the negative direction of the FA axis, is maximum, its value being given by the projection of point M on such axis.

Now, from this maximum negative value, the amplitude of the sweep field decreases to zero and then increases in the opposite direction. The magnetization of the film, oriented now in the negative direction of the FA axis and representing storage of the binary value "0," is not reversed as the end of the vector representative of the control field moves from point M toward point I, FIG. 1. Under these conditions, the signals induced by the rotation of the magnetization substantially maintains a constant amplitude, as shown by the segment M′I′ of the cycle of FIG. 5. Actually, however, this amplitude increases slightly and progressively as the sweep field diminishes, as is shown on the cycle, because of the progressive increase of the angle through which the magnetization of the film turns.

When the end of the vector representative of the control field moves from point I toward joint J, FIG. 1, i.e., when it enters zone II, the magnetization of the film is progressively destroyed in accordance with the "creeping" phenomenon, which is demonstrated by a decrease in the amplitude of the induced signal, as shown by segment I′J′ of the cycle of FIG. 5. When the end of the vector representative of the control field passes point J, FIG. 1, and enters zone III, the magnetization of the film is again reversed abruptly and partially, this transition being represented by the segment J′J″ of the cycle of FIG. 5. This partial reversal propagates by degree into the different magnetization domains of the film as the end of the vector representative of the control field moves from point J toward point K, FIG. 1. In FIG. 5 this progressive reversal of the magnetization is represented by the segment J″K′ of the cycle. When the end of this vector arrives at point K, FIG. 1, wherein the projection on the easy axis corresponds to the coercive field of wall motion, the domains which have continued to be oriented in the negative direction along the negative easy axis switch definitely to the opposite direction as demonstrated in FIG. 5 by the abrupt jump from point K′ to K″. Following this moment, as the end of the control field vector moves from point K toward point P, FIG. 1, the signals induced by the rotation of the magnetization maintain a substantially constant amplitude, as shown by the segment K″P′ of the cycle of FIG. 5.

The cycle which has been described repeats for each period of the alternating voltage that is applied to the horizontal deflection plates 24 of the oscilloscope. The characteristic points on the cycle are points F' and I', which correspond to the passage from zone I to zone II; i.e., across the threshold of non-destructive readout, above which the rotation of the magnetization ceases to be reversible; the points G', G'', J', and J'', which correspond to the passage from zone II to zone III; i.e., across the threshold of coherent rotation; and the points H', H'', K', and K'', which correspond to the threshold of wall motion.

The projections of points F' and I' on the easy axis determine two values, identified respectively as $-H_{BR}$ and $+H_{BR}$, which are the respective thresholds of two fields along the respective positive and negative easy axes, below which the magnetization turns in reversible manner and is not destroyed by the action of orienting fields in the hard direction. The intersections with the easy axis of segments G'G'' and J'J'' determine two values, identified respectively as $-H_B$ and $+H_B$, which are the respective thresholds of two fields along the positive and negative easy axes, above which the magnetization reverses in part under the action of orienting fields in the hard direction. Finally the projections of points H', H'', K', and K'' on the easy axis determine two values, $-H_c$ and $+H_c$, which define along both the positive and negative easy axes the amplitude of the coercive field of wall motion.

If the oscilloscope previously has been carefully calibrated, from the Belson cycle can be deduced the respective values of the different threshold fields; i.e., of $H_{BR}$, of $H_B$, and of $H_c$. It is seen, by reference to FIGS. 1 and 2, that the values of $H_B$ and of $H_{BR}$ so obtained differ according to the amplitude of the field $H_y$ oriented along the hard axis. In order to eliminate such ambiguities, it is considered in this entire description that the values of $H_B$ and of $H_{BR}$ have been determined by utilizing a control field wherein the component $H_y$ along the hard axis has an amplitude substantially equal to that of the word fields employed under normal conditions of operation of the memory. To this effect, the amplitude of the component $H_y$ of the fields produced by winding 11 is about 8 oersteds.

Figure 2:
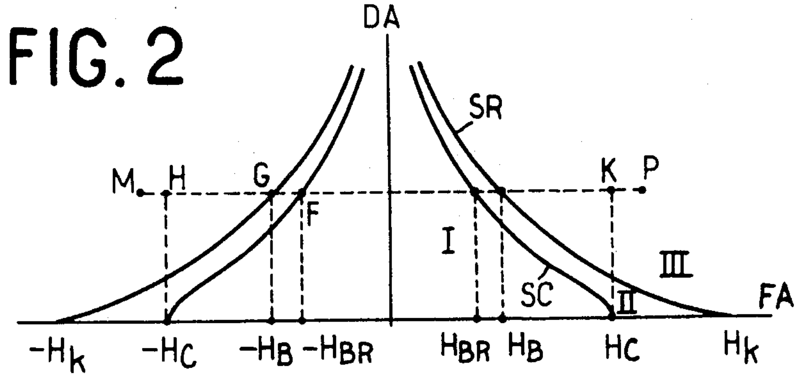
FIG. 2 is a series of curves illustrating the threshold of coherent rotation at different points and the critical threshold of destruction of information in a thin magnetic film reposited on a support which has been subjected to the treatment of the invention.

In order that the magnetic film be insensitive to the action of stray magnetic fields and provide the desired property of non-destructive read-out it, is necessary as can be determined by an inspection of FIGS. 1 and 2, not only that the value $H_{BR}$ of the threshold of non-destructive readout be sufficiently high, but also that the difference $H_B - H_{BR}$, between the value of the threshold of coherent rotation and the value of the threshold of non-destructive readout, which provides a characterization of the relationship of curves SC and SR, be the least possible. It has been found, for a material presenting under normal conditions of employment the properties of non-destructive readout that it is sufficient that its threshold field $H_{BR}$ be greater than a minimum value of about 115 millioersteds.

It is therefore possible in treating the substrate according to the invention by employing an aqueous solution of hydrochloric acid of a given concentration and containing a predetermined proportion of copper ions (this proportion, sometimes, can be zero), to determine the values of the current density for which the degree of attack on the substrate provides that the film which is subsequently deposited on such substrate presents the desired magnetic properties. For this, there is conducted a first test of the treatment on a first substrate sample, by operating with a first value of constant current density. After having deposited on this substrate sample a thin film of magnetic material, the Belson cycle is employed to determine the values $H_{BR}$, $H_B$, and $H_c$ of the magnetic film so deposited. Next a second test of the treatment on a second substrate sample of the same nature and of the same dimensions is conducted, by operating with the same bath, but with another value of constant current density. After having deposited on this second substrate sample a thin film of magnetic material, the values $H_{BR}$, $H_B$ and $H_c$ of this second layer are determined by the same method. By conducting a series of such tests, operating each time with a different value of current density but with the same bath, a series of values of $H_{BR}$, $H_B$, and $H_c$ corresponding to each value of the current density is determined. From these values can be plotted, point-by-point, respective curves which represent the variations of $H_{BR}$, of $H_B$, of $H_B - H_{BR}$ and of $H_c$ as a function of the current density. From these curves, can be determined the values of the current density which are suitable to select for regulating the degree of attack on the substrate, so that the magnetic film subsequently deposited on such substrate presents the desired magnetic properties. The values of current density selected are those for which the threshold $H_{BR}$ attains or exceeds about 115 millioersteds, and for which, also, the difference $H_B - H_{BR}$ is as small as possible.

Figure 6:
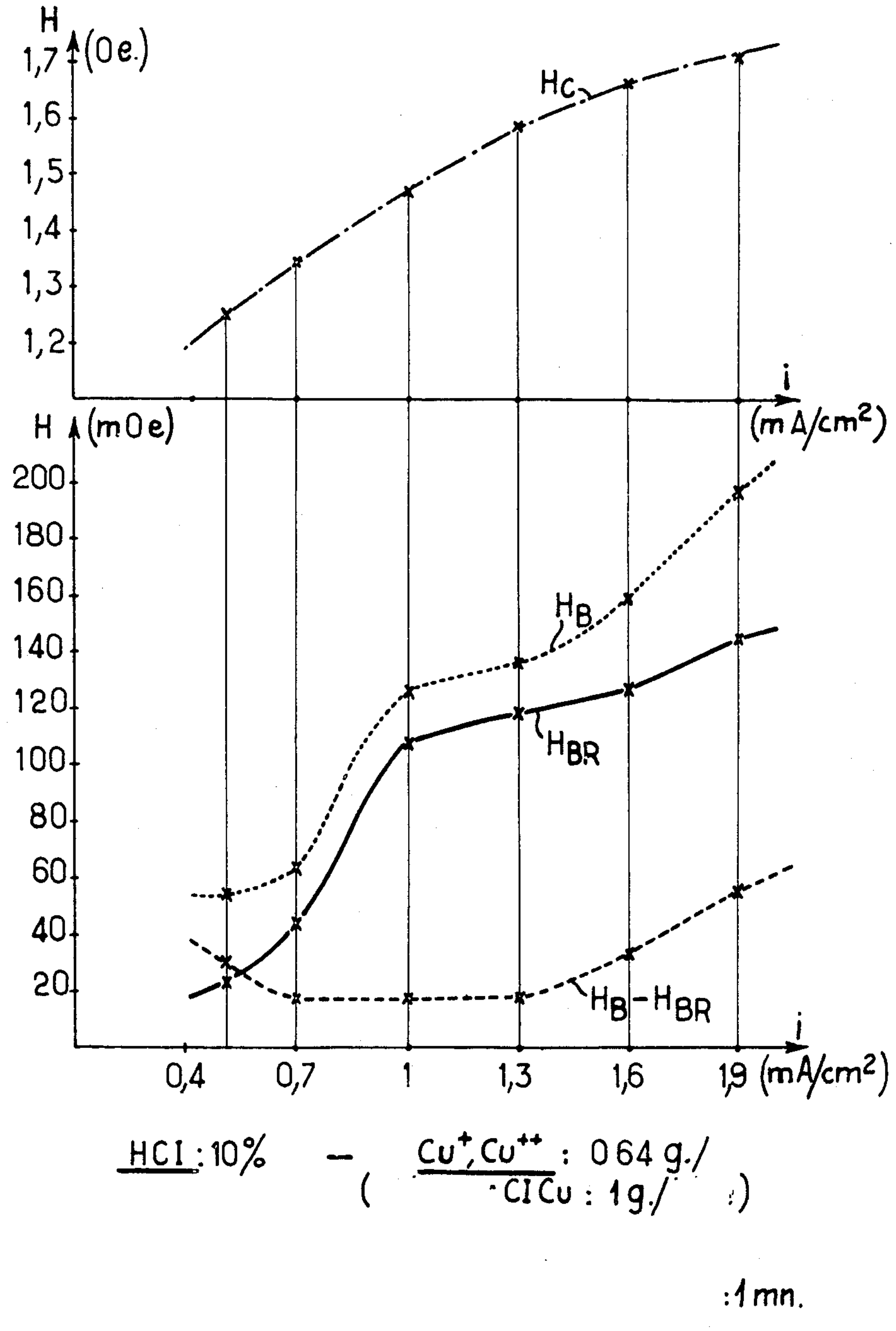
FIG. 6 is a set of curves showing the variations of the magnetic characteristics of the film as a function of the current regulating the degree of attack of the substrate when the substrate is treated with an aqueous solution of 10% hydrochloric acid.

FIG. 6 shows, by way of example, curves representing the variations of $H_{BR}$, $H_B$, $H_B - H_{BR}$, and $H_c$ as a function of the current density in a bath utilized for treating a substrate. The bath constitutes an aqueous solution of 10% of hydrochloric acid, which contains 1 gram per liter of cuprous chloride. The substrate is attacked by the bath at ambient temperature and for about one minute. The current employed for regulating the attack is, in this instance, an anodic current of dissolution. These operating conditions (concentration of HCl, proportion of copper ions, direction of current, temperature and time of attack) are specified below the curves. The curves of FIG. 6, show that the values of the current density which are suitable for selection in this instance, so that the magnetic material is insensitive to perturbations and presents the property of non-destructive readout, are those which are about 1.3 milliamperes per square centimeter. The curve values which correspond to this current density are $H_B = 134$ millioersteds, $H_{BR} = 117$ millioersteds, $H_c = 1.57$ oersteds, and $H_{BR} = 17$ millioersteds.

By operating in the manner which has been described above and by selecting, for treating the substrate, solutions having various initial concentrations of hydrochloric acid and of copper ions, a series of curves can be provided which represent the variations of $H_{BR}$, $H_B$, $H_B - H_{BR}$, and $H_c$ as a function of the current density, each such set of curves corresponding to a particular value of concentration of hydrochloric acid and to a particular value of concentration of copper ions. From these curves can be determined, for the concentration of hydrochloric acid and the concentration of copper ions utilized, the values of the current density which are suitable for selection to control the attack on the substrate, such values being those for which the threshold $H_{BR}$ attains or exceeds 115 millioersteds and for which the difference $H_B - H_{BR}$ is minimum. By adopting these values of current density, corresponding to the concentration of hydrochloric acid and of copper ions in the solution utilized for attacking the substrate, and by operating under the conditions which have been indicated previously herein and which are also repeated below the curves, a state of the substrate surface is obtained such that the magnetic film which is subsequently deposited on such substrate presents the properties of non-destructive read-out and of insensitivity to the action of stray leakage fields, under normal conditions of employment.

Much that has been described in the foregoing and that is represented on the drawing is characteristic of the invention. It is evident that one skilled in the art is able to adduce all modifications of form and the detail using his judgment, without departing from the scope of the invention.

I claim:

1. In a process for fabricating a memory element constituted of a copper substrate covered with a thin magnetic film presenting a uniaxial anisotropy, a treatment of the substrate prior to the coating of the magnetic film, said treatment being characterized in that said substrate is immersed in an aqueous solution of hydrochloric acid of between 5% and 45% concentration at the ambient temperature and for a duration of the order of one minute, during such immersion the substrate being utilized as an electrode, the attack on said substrate in the bath being regulated by a constant current density having a value selected after a determination of curves which represent, for the concentration of hydrochloric acid employed, the variations of the threshold of non-destructive readout and of the threshold of coherent rotation as a function of the current density, said current density value being one for which the threshold of non-destructive readout is greater than about 115 millioersteds and for which the difference between the threshold of coherent rotation and the threshold of non-destructive readout is minimum, whereby the surface of said substrate obtained is then such that the thin magnetic film which is subsequently deposited on the said substrate is virtually insensitive to the action of stray magnetic fields and presents a high coercive force.

2. The treatment of a substrate according to claim 1, wherein said aqueous solution of hydrochloric acid contains further a soluble salt of copper, of a quantity wherein the concentration of copper ions resulting from the incorporation of said salt into the solution comprises between 60 milligrams and 1.3 grams per liter of solution.

3. The treatment of a substrate according to claim 2, wherein said soluble salt of copper incorporated into the solution is cuprous chloride.

4. The treatment of a substrate according to claim 1, wherein said aqueous solution of hydrochloric acid has a 10% concentration and contains cuprous chloride of an amount comprising between 100 milligrams and 2 grams per liter of solution, and wherein said substrate is utilized as the anode permitting the current to preferentially attack said substrate.

5. The treatment of a substrate according to claim 1, wherein said solution of hydrochloric acid has a 10% concentration and contains cuprous chloride in the amount of 1 gram per liter of solution, and wherein said attack on the substrate is effected during a time of the order of one minute and is regulated by a constant current density of the order of 1.3 milliamperes per square centimeter, said substrate being utilized as the anode for permitting the current to preferentially attack said substrate.

6. In a process for fabricating a memory element by coating a copper substrate with a thin magnetic film, a preliminary treatment for said substrate comprising immersing said substrate in a bath containing an aqueous solution of hydrochloric acid of less than 50% concentration for a particular interval of time, and during said interval of immersion passing a current of constant density of a particular value through said bath utilizing said substrate as an electrode, said particular value of current, said concentration of solution, and said particular interval being chosen so that for the magnetic film to be coated on the treated substrate the threshold of non-destructive readout is greater than a predetermined value and the difference between the threshold of coherent rotation and said threshold of non-destructive readout is substantially minimum.

7. The process of claim 6 wherein said concentration of said aqueous solution of hydrochloric acid is between 5% and 45%.

8. The process of claim 7 wherein said interval of time is about one minute.

9. In a process for fabricating a memory element by coating a copper substrate with a thin magnetic film, a preliminary treatment for said substrate comprising immersing said substrate in a bath containing an aqueous solution of hydrochloric acid of between 5% and 45% concentration for a duration of about one minute, during said duration of immersion, passing a current of constant density of particular value through said bath utilizing said substrate as an electrode; prior to said immersion, obtaining a series of curves of threshold of non-destructive readout ($H_{BR}$) and threshold of coherent rotation ($H_B$) versus current density for magnetic films deposited on substrates obtained by immersion in said bath and subjected to current densities of different value, and selecting said particular value of current density from said curves for which $H_{BR}$ is greater than a predetermined value and the difference between $H_B$ and $H_{BR}$ is minimum.

10. A method of determining the optimum value of current density to employ for treating a substrate on which a thin magnetic film is to be deposited to form a memory element, comprising:

preparing a plurality of memory element samples utilizing baths of the same concentration but different values of current density for treating the substrates of said samples prior to deposition of the magnetic film thereon, testing each sample to obtain data representing the respective values of threshold of coherent rotation ($H_B$) and threshold of nondestructive readout ($H_{BR}$), and from said data identifying said optimum value of current density as the value of current density for which $H_{BR}$ is greater than a predetermined value and the difference between $H_B$ and $H_{BR}$ is minimum.

11. The method of claim 10 wherein said testing comprises obtaining a Belson cycle for each sample.

12. The method of claim 10 further including employing said data to plot curves of $H_B$ and $H_{BR}$ versus corresponding current density, wherein said optimum of current density is identified from said curves.

References Cited

UNITED STATES PATENTS

| | | | |
|---|---|---|---|
| 2,133,255 | 10/1938 | Rogers | 204—145 |
| 2,241,316 | 5/1947 | Carson | 204—141 |
| 2,557,823 | 6/1951 | Holbrook | 204—141 |

JOHN H. MACK, Primary Examiner

T. TUFARIELLO, Assistant Examiner

U.S. Cl. X.R.

204—140